United States Patent [19]
Zimmermann

[11] Patent Number: 4,718,565
[45] Date of Patent: Jan. 12, 1988

[54] PLASTIC JUG OR FLASK, PARTICULARLY A PLASTIC JACKET OF AN INSULATING JUG OR FLASK, HAVING A RELIEF ORNAMENT ON THE JACKET SURFACE

[75] Inventor: Anso Zimmermann, Niederaula, Fed. Rep. of Germany

[73] Assignee: Rotpunkt Dr. Anso Zimmermann, Niederaula, Fed. Rep. of Germany

[21] Appl. No.: 855,969

[22] Filed: Apr. 23, 1986

[30] Foreign Application Priority Data

Jul. 26, 1985 [DE] Fed. Rep. of Germany ....... 3526884

[51] Int. Cl.⁴ .................... A47J 41/00; B29C 45/26
[52] U.S. Cl. .................... 215/1 C; 215/12.1; 249/160
[58] Field of Search ........... 215/1 C, 12 R, 12 A, 215/13 R, 13 A, 100 A; D7/77; 249/117, 160, 58, 59; 425/406, 408, 542; 220/420, 425, 415

[56] References Cited

U.S. PATENT DOCUMENTS

| | | | |
|---|---|---|---|
| D. 63,396 | 12/1923 | Curtiss | D7/77 X |
| 145,144 | 12/1873 | Baggs | 249/58 X |
| 2,187,558 | 1/1940 | Kushima | 215/12 R |
| 2,358,857 | 9/1944 | Gits | 249/59 X |
| 2,493,380 | 1/1950 | Bailey | 215/13 R X |
| 2,741,386 | 4/1956 | Williams | 215/12 R |
| 2,954,888 | 10/1960 | Bramming | 215/13 R |
| 3,441,254 | 4/1969 | Merke, Jr. | 249/160 |
| 4,280,630 | 7/1981 | Hafele | 215/1 C X |

FOREIGN PATENT DOCUMENTS

| | | | |
|---|---|---|---|
| 8400916 | 5/1984 | Fed. Rep. of Germany | |
| 1202425 | 7/1959 | France | 215/13 R |
| 2545449 | 11/1984 | France | 222/107 |

Primary Examiner—William Price
Assistant Examiner—Sue A. Weaver
Attorney, Agent, or Firm—Scully, Scott, Murphy & Presser

[57] ABSTRACT

The invention relates to a plastic jug or flask, in particular a plastic jacket of an insulating jug or flask that is produced by injection moulding in a multipart injection mould having axial separation joints, and has on the jacket surface a relief ornament which exhibits substantially vertical and spiral projections defining between them resilient jacet surface strips. The problem underlying the invention is to design the jug or flask so that it can be produced in a two-part injection mould. This problem is solved in that the jacket surface strips (14) make, in the region of the single separating joint of a two-part injection mould, exterior angles with the median axial plane (E) of the insulating jug (1) or of the plastic jacket (2) equal to or slightly greater than 90°.

6 Claims, 4 Drawing Figures

PLASTIC JUG OR FLASK, PARTICULARLY A PLASTIC JACKET OF AN INSULATING JUG OR FLASK, HAVING A RELIEF ORNAMENT ON THE JACKET SURFACE

TECHNICAL FIELD OF THE INVENTION

The invention relates to a jug or flask having a relief ornament provided on the jacket surface thereof.

DESCRIPTION OF THE PRIOR ART

A jug of this construction is on the market and is therefore known. The jug concerned is an insulating jug whose plastic jacket has substantially vertical, spiral projections that define between them resilient strips of the jacket surface. With such a relief ornament difficulties occur in the production of the jug using an injection mould with only one line of division (two halfmoulds) because of the spiral course of the projections. These difficulties are caused by the fact that in the region of the dividing joints the jacket surface strips form undercuts that hinder the removal of the jug. For the production of the known shape a three-part injection mould is required. Such an injection mould has a complicated shape and is expensive to produce. In addition, the three dividing joints of the injection mould leave three seams on the jacket surface of the jug, which impair the relief ornament and the appearance of the jug, and should therefore be kept as few as possible in number.

OBJECT OF THE INVENTION

The problem underlying the invention is to design a jug or flask of the kind already indicated so that it can be produced in a two-part injection mould.

SUMMARY OF THE INVENTION

The design according to invention comprises a special shape of the strips of the jacket surface in the region of the axial lines of the jacket, namely such that in this region they make an angle equal to or slightly greater than 90° with the median planes of the jug in which the axial lines of the jacket lie. With this form there are no undercuts. Consequently, a jug shaped according to the invention can be produced in two-part injection moulds, which are much simpler than three-part ones.

Furthermore, only two seams are produced on the surface of the jacket of the jug in the region of the dividing joints of the injection mould, which is an important advantage compared with the three seams in the known design.

The relief ornament which forms the starting point of the invention is one with relatively flat resilient strips of the jacket surface. That is to say at each point of their surfaces the sections of the jacket surface strips that run in the neighbourhood of the axial lines of the jacket, but are spaced circumferentially from the axial lines of the jacket, make an angle which is also equal to or slightly smaller than 90° with the median axial plane in which the axial lines of the jacket lie. That is to say, within the scope of the invention it is possible to use jacket surface strips whose depth is such that when they do not intersect the axial lines of the jacket they form no undercuts. In the case of jugs that are substantially circular in section the depth of the jacket surface strips can thus be increased towards the parts of the convexity of the jug farthest from the axial lines of the jacket.

Within the scope of the invention it is an advantage, on grounds of saving in material, to form the projections by ridges that meet in the form of a roof. This shape also provides a good safe grip, which facilitates handling of the jug, for example for maintenance and cleaning.

Within the scope of the invention the jacket surface strips can have a slight concave curve or they can also have regular or irregular forms. The above-mentioned shape contributes to the improvement of the appearance of the jug.

The shape is advantageous in that the edges of the jacket surface strips that are most likely to form undercuts are as far as possible from the respective axial lines of the case and therefore have a lesser tendency to form undercuts.

The form according to the invention leads to a change in the relief ornament in the region of the axial lines of the case. This is because the jacket surface strips in the region of the axial lines of the jacket are slightly raised relative to the other parts of the jacket surface strips. In the least favorable case, namely when the jacket surface strips in the region of the axial lines of the jacket form an angle of 90° with the median axial plane in which the axial lines of the jacket lie, the projections run out so that they are no longer visible. The construction makes it possible to arrange the raised regions of the jacket surface strips in the region of the handle and also, in the case of a jug, beneath the spout, where they are less visible.

The form makes it possible to retain the relief ornament even in jugs that narrow towards the top.

BRIEF DESCRIPTION OF THE DRAWINGS

A preferred example of the invention will now be described in more detail with reference to a simplified drawing, in which.

DETAILED DESCRIPTION OF AN EMBODIMENT OF THE INVENTION

Figure 1:
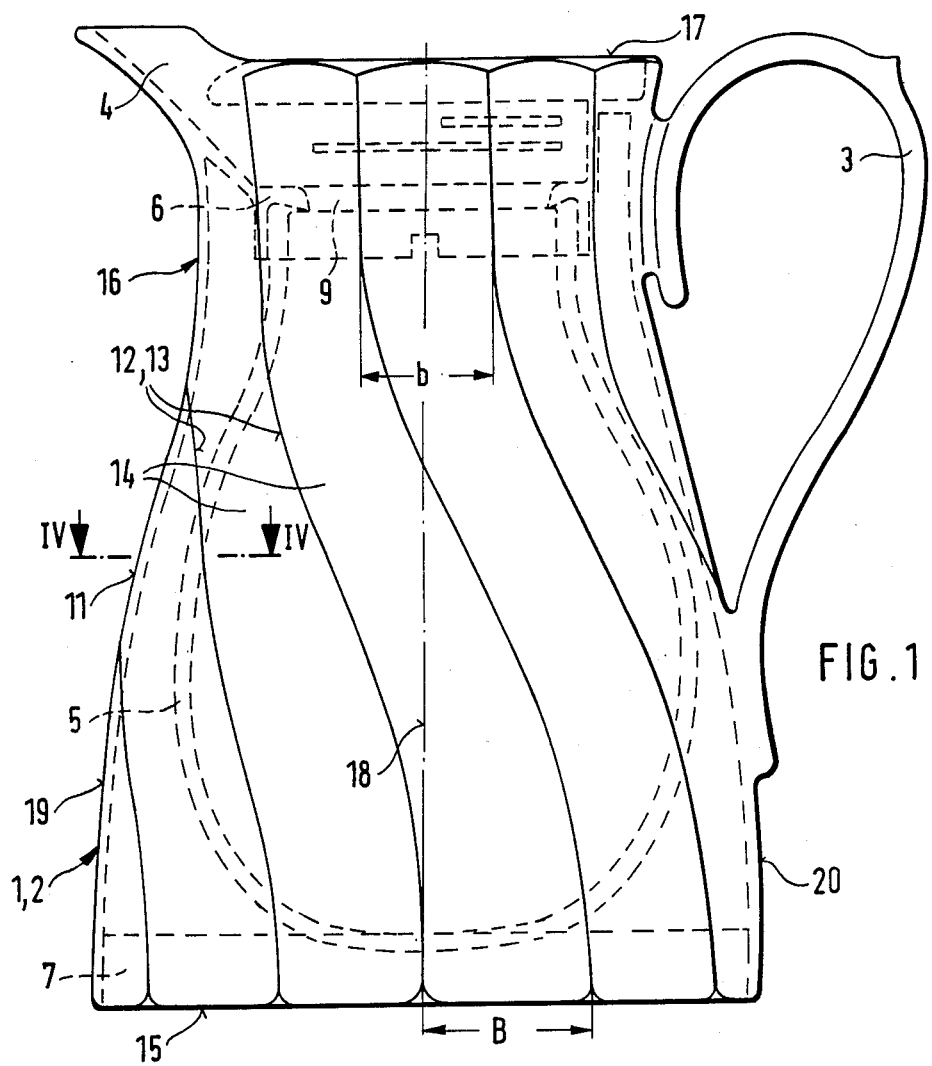
FIG. 1 shows a side view of an insulating jug constructed according to the invention.

The insulating jug indicated generally by 1 in FIG. 1 consists of a plastic protective housing 2 in the form of a jacket indicated generally by 2, on which a handle 3 and a spout 4 are integrally formed, an insulating container 5 contained within the protective housing 2 and held between a shoulder 6 in the upper part of the protective housing 2 and a screwed-in bottom part 7 of the protective housing 2, and a stopper (not shown) by means of which the opening 9 of the jug in the region of the shoulder 6 can be closed.

On the jacket surface 11 of the protective housing 2 there is a relief ornament, indicated generally by 12, in the form of substantially vertical raised ridges 13 running upwards as anticlockwise rifling, which include between them resilient jacket surface strips 14. In horizontal section the jacket surface strips 14 are slightly curved, as can be seen clearly from the partial section in FIG. 4. The ridges 13 are formed by sections of the surface of the jacket surface strips which meet in the form of a roof, and may preferably be slightly rounded. In the present exemplary embodiment there are thirteen ridges 13 which include twelve jacket surface strips 14 between them. The regular thirteen-cornered protective housing 2 is widest at its lower rim 15, narrows upwards in the form of a dome to a waist 16 and widens out slightly above the waist 16 to its upper rim 17. The breadth of the jacket surface strips 14 correspondingly decreases to the waist 16 and increases slightly above the waist 16. The breadth of the jacket surface strips 14 is indicated at the bottom rim by B and in the region of the waist 16 by b.

Figure 2:
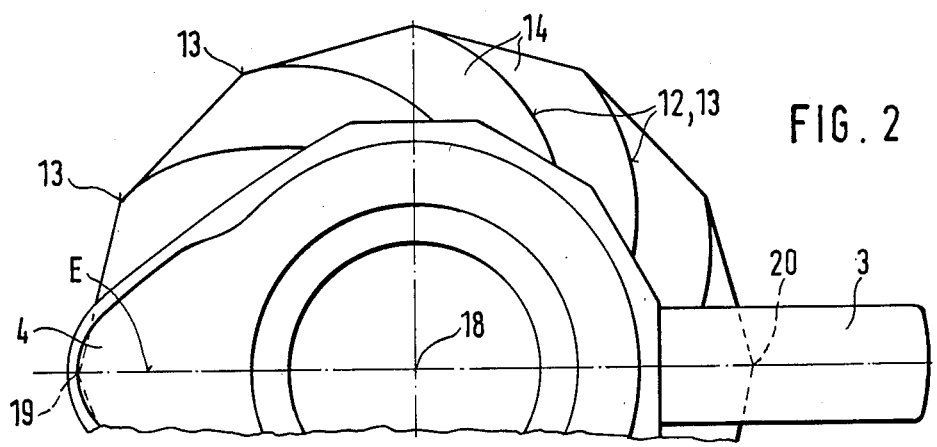
FIG. 2 shows a partial plan view of the insulating jug from above.
Figure 3:
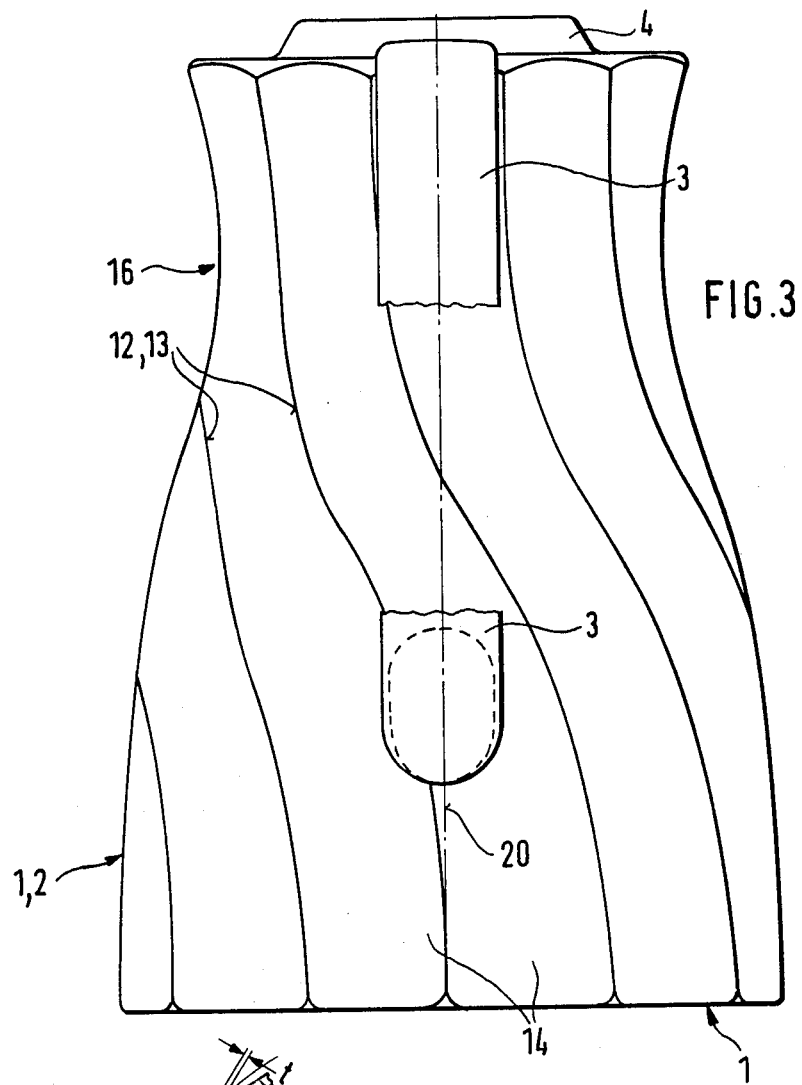
FIG. 3 shows the insulating jug in an elevation from the right.
Figure 4:
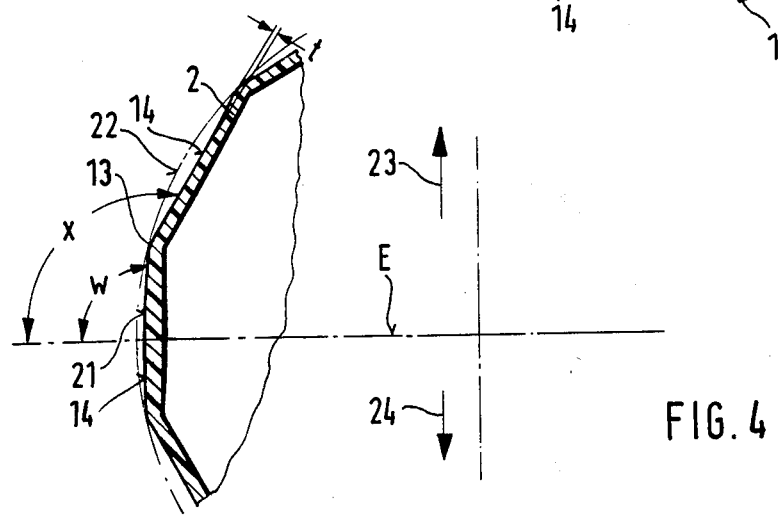
FIG. 4 shows the section on IV–IV in FIG. 1.

The protective housing 2 is an injection-moulded plastic part, for the production of which there is provided an injection mould (not shown) consisting of two halves with a plane of separation in which the central axis 18 lies and which at the same time forms a median axial plane of the protective housing 2 and is indicated in FIG. 2 and 4 by E. The dividing joints (not shown) of the injection mould run along the jacket surface 11 of the protective housing from the axial jacket lines 19, 20. The arrangement is such that the separation plane E of the injection mould runs out through the spout 4 and the handle 3, and through opposed ridges 13 at the bottom rim 15 of the protective housing 2.

In the regions of the axial jacket lines 19, 20 in which they are crossed by the jacket surface strips 14 (see the partial section according to FIG. 4) the sections of the jacket surface strips 14 indicated by 21 are somewhat raised relative to their other sections and are so shaped that they include, with the separating plane of the injection mould or with the median axial plane E of the protective housing 2, an exterior angle w the sides of which lie in the respective radial plane (section lines IV—IV in FIG. 1) and include an angle that is greater than or equal to 90°, and is preferably slightly greater than 90°. Since the depth t of the jacket surface strips 14 relative to an imaginary envelope 22 through the ridges 13, and shown by way of indication, is also only so great that the jacket surface strips 14 include, at every point with the exception of the above-mentioned sections 21 in the region of the axial jacket lines 19, 20, an exterior angle x with the dividing plane E of the injection mould that is equal to or preferably slightly larger than 90° and whose sides lie in the said radial plane, the protective housing 2 can be removed from the mould without damage by removing the halves of the injection mould (not shown) radially outwards in the directions indicated by the arrows 23 and 24.

The exterior angles w, x are advantageously slightly greater than 90° so that on removal of the protective housing from the mould there is rapid separation from the walls of the injection mould.

In the preferred embodiment of the invention described above the jacket surface strips 14 have the same form. It is however also possible, within the scope of the invention, to provide irregular forms of the jacket surface strips, e.g. irregular breadths B, b. The external form of the protective housing 2 is likewise not limited to the preferred form described above. It is likewise possible within the scope of the invention to provide the relief ornament 12 on a cylindrical external form. Moreover it is also possible within the scope of the invention to provide the design according to the invention on a flask, preferably on the protective housing of an insulating flask. This can be a flask or insulating flask with or without a handle.

The greater the pitch of the jacket surface strips 14 or of the relief ridges 13, the greater is the region of the jacket surface strips 14 that is raised according to the invention. Hence a pitch of 1 to 2, and preferably 1.5 times the breadth B, b of the jacket surface strips is particularly advantageous. In the latter case the respective relief ridges 13 run out at the bottom rim 15 of the jug 1 or of the protective casing 2 at the axial jacket lines 19, 20 there, while at the upper rim 17 the axial jacket lines 19, 20 run in the middle of the jacket surface strip there.

What is claimed is:

1. In a plastic jug or flask, particularly a plastic jacket of an insulating jug or flask, that is produced by injection molding in a two-part injection mold having axial dividing joints for forming axial jacket seam lines on the jacket surface of the plastic jacket, and a relief ornament on the jacket surface in the configuration of substantially vertical and spiral projections defining resilient jacket surface strips therebetween; the improvement comprising in that two jacket seam lines formed by said mold extend in a median axial plane (E), and the jacket surface strips in the region of the jacket seam lines subtend exterior angles (W) equal to or slightly greater than 90° with the median axial plane (E) of said jug.

2. A jug or flask according to claim 1, characterized in that the projections are formed by ornamental ridges which are formed by jacket surface strips that meet in the shape of a roof.

3. A jug or flask according to claim 1, characterized in that the jacket surface strips are concavely curved in horizontal section.

4. A jug or flask according to claim 1, characterized in that at the bottom rim of the jug or flask or of the plastic jacket, in the region of the axial jacket seam lines that lies in the lines of intersection between the dividing joints and the jacket surface, the ornamental ridge or ridges run asymptotically into the axial jacket seam lines.

5. A jug or flask according to claim 4, characterized in that the axial jacket seam lines, a handle and the spout all lie in the median plane (E).

6. A jug or flask according to claim 1, characterized in that the jug or flask and the jacket surface strips narrow upwards, and in particular narrow to a waist and widen out again above the waist.

* * * * *

UNITED STATES PATENT AND TRADEMARK OFFICE
CERTIFICATE OF CORRECTION

PATENT NO. : 4,718,565

DATED : January 12, 1988

INVENTOR(S) : Anso Zimmermann

It is certified that error appears in the above-identified patent and that said Letters Patent is hereby corrected as shown below:

Column 1, line 10: "DESCRIPTION OF THE PRIOR ART" should read as --BRIEF DESCRIPTION OF THE PRIOR ART--

Column 4, line 51, Claim 5: "in the median plan" should read as --in the median axial plane--

Signed and Sealed this

Sixth Day of September, 1988

Attest:

DONALD J. QUIGG

*Attesting Officer*

*Commissioner of Patents and Trademarks*